(12) United States Patent
Langlois et al.

(10) Patent No.: US 10,497,984 B2
(45) Date of Patent: *Dec. 3, 2019

(54) EMBEDDED SOLID-STATE BATTERY

(71) Applicant: Sakti3, Inc., Ann Arbor, MI (US)

(72) Inventors: Marc Langlois, Ann Arbor, MI (US); Ann Marie Sastry, Ann Arbor, MI (US); Myoungdo Chung, Ann Arbor, MI (US); HyonCheol Kim, Ann Arbor, MI (US); Stephen Buckingham, Ypsilanti, MI (US)

(73) Assignee: Sakti3, Inc., Ann Arbor, MI (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/487,352

(22) Filed: Apr. 13, 2017

(65) Prior Publication Data
US 2017/0352922 A1    Dec. 7, 2017

Related U.S. Application Data

(63) Continuation of application No. 13/653,366, filed on Oct. 16, 2012, now Pat. No. 9,627,717.

(51) Int. Cl.
*H01M 6/18* (2006.01)
*H01M 10/0585* (2010.01)
(Continued)

(52) U.S. Cl.
CPC ....... *H01M 10/0585* (2013.01); *H01M 2/266* (2013.01); *H01M 6/188* (2013.01);
(Continued)

(58) Field of Classification Search
None
See application file for complete search history.

(56) References Cited

U.S. PATENT DOCUMENTS 2,862,646 A    12/1958    Hayford et al.
4,009,052 A    2/1977    Whittingham
(Continued)

FOREIGN PATENT DOCUMENTS

EP    1 593 754    11/2005
JP    5-320906    12/1993
(Continued)

OTHER PUBLICATIONS

Aceves, S. et al. "Computer Modeling in the Design and Evaluation of Electric and Hybrid Vehicles," 11th Annual National Educators' Workshop, Oct. 27-30, 1996, Los Alamos, New Mexico; 12 pages.
(Continued)

*Primary Examiner* — Wojciech Haske
(74) *Attorney, Agent, or Firm* — Morrison & Foerster LLP

(57) ABSTRACT

Elements of an electrochemical cell using an end to end process. The method includes depositing a planarization layer, which manufactures embedded conductors of said cell, allowing a deposited termination of optimized electrical performance and energy density. The present invention covers the technique of embedding the conductors and active layers in a planarized matrix of PML or other material, cutting them into discrete batteries, etching the planarization material to expose the current collectors and terminating them in a post vacuum deposition step.

11 Claims, 9 Drawing Sheets

(51) Int. Cl.
  *H01M 10/04*  (2006.01)
  *H01M 10/0562*  (2010.01)
  *H01M 2/26*  (2006.01)
  *H01M 10/052*  (2010.01)
  *H01M 6/46*  (2006.01)
  *H01M 10/28*  (2006.01)
  *H01M 10/42*  (2006.01)

(52) U.S. Cl.
  CPC .......... *H01M 6/46* (2013.01); *H01M 10/044* (2013.01); *H01M 10/0413* (2013.01); *H01M 10/0418* (2013.01); *H01M 10/0436* (2013.01); *H01M 10/0463* (2013.01); *H01M 10/0472* (2013.01); *H01M 10/052* (2013.01); *H01M 10/0562* (2013.01); *H01M 10/0404* (2013.01); *H01M 10/28* (2013.01); *H01M 10/281* (2013.01); *H01M 10/282* (2013.01); *H01M 10/287* (2013.01); *H01M 10/425* (2013.01); *H01M 2010/0495* (2013.01); *H01M 2220/30* (2013.01); *Y02T 10/7011* (2013.01)

(56) References Cited

U.S. PATENT DOCUMENTS

| | | | |
|---|---|---|---|
| 4,648,347 A | 3/1987 | Aichert et al. | |
| 4,854,264 A | 8/1989 | Noma et al. | |
| 4,933,889 A | 6/1990 | Meshkat et al. | |
| 5,107,791 A | 4/1992 | Hirokawa et al. | |
| 5,338,625 A | 8/1994 | Bates et al. | |
| 5,367,465 A | 11/1994 | Tazawa et al. | |
| 5,377,118 A | 12/1994 | Leon et al. | |
| 5,402,366 A | 3/1995 | Kihara et al. | |
| 5,411,592 A | 5/1995 | Ovshinsky et al. | |
| 5,453,934 A | 9/1995 | Taghavi et al. | |
| 5,498,489 A | 3/1996 | Dasgupta et al. | |
| 5,571,749 A | 11/1996 | Matsuda et al. | |
| 5,582,935 A | 12/1996 | Dasgupta et al. | |
| 5,747,188 A | 5/1998 | von Sacken et al. | |
| 5,751,591 A | 5/1998 | Asada | |
| 5,906,757 A | 5/1999 | Kong et al. | |
| 6,016,047 A | 1/2000 | Notten et al. | |
| 6,294,479 B1 | 9/2001 | Ebe et al. | |
| 6,350,222 B2 | 2/2002 | Susnjara | |
| 6,402,443 B1 | 6/2002 | Hoppe | |
| 6,656,234 B2 | 12/2003 | Dexter et al. | |
| 6,833,031 B2 | 12/2004 | Arnold | |
| 6,884,333 B2 | 4/2005 | Landau | |
| 6,924,164 B2 | 8/2005 | Jenson | |
| 6,962,823 B2 | 11/2005 | Empedocles et al. | |
| 6,982,132 B1* | 1/2006 | Goldner .................... | E06B 9/24 204/192.11 |
| 7,107,193 B1 | 9/2006 | Hummel et al. | |
| 7,194,801 B2 | 3/2007 | Jenson et al. | |
| 7,294,209 B2 | 11/2007 | Shakespeare | |
| 7,315,789 B2 | 1/2008 | Plett | |
| 7,361,327 B2 | 4/2008 | Tumas et al. | |
| 7,490,710 B1 | 2/2009 | Weskamp et al. | |
| 7,553,584 B2 | 6/2009 | Chiang et al. | |
| 7,579,112 B2 | 8/2009 | Chiang et al. | |
| 7,618,742 B2 | 11/2009 | Kaplin et al. | |
| 7,625,198 B2 | 12/2009 | Lipson et al. | |
| 7,901,807 B2 | 3/2011 | Honda et al. | |
| 7,945,344 B2 | 5/2011 | Wang et al. | |
| 8,168,326 B2 | 5/2012 | Chiang et al. | |
| 2002/0120906 A1 | 8/2002 | Xia et al. | |
| 2002/0169620 A1 | 11/2002 | Spotnitz et al. | |
| 2003/0064292 A1 | 4/2003 | Neudecker et al. | |
| 2003/0068559 A1 | 4/2003 | Armstrong et al. | |
| 2003/0082446 A1 | 5/2003 | Chiang et al. | |
| 2003/0099884 A1 | 5/2003 | Chiang et al. | |
| 2003/0108800 A1 | 6/2003 | Barbarich | |
| 2004/0131761 A1 | 7/2004 | Shakespeare | |
| 2004/0131925 A1 | 7/2004 | Jenson et al. | |
| 2004/0131937 A1 | 7/2004 | Chen et al. | |
| 2004/0144321 A1 | 7/2004 | Grace et al. | |
| 2004/0151985 A1 | 8/2004 | Munshi | |
| 2004/0185336 A1 | 9/2004 | Ito et al. | |
| 2004/0185667 A1 | 9/2004 | Jenson | |
| 2004/0258851 A1 | 12/2004 | Selvamanickam et al. | |
| 2005/0079418 A1 | 4/2005 | Kelley et al. | |
| 2005/0114105 A1 | 5/2005 | Barber | |
| 2005/0244580 A1 | 11/2005 | Cok et al. | |
| 2006/0138350 A1 | 6/2006 | Banine et al. | |
| 2006/0156978 A1 | 7/2006 | Lipson et al. | |
| 2007/0110892 A1 | 5/2007 | Awata et al. | |
| 2007/0186852 A1 | 8/2007 | Sakata et al. | |
| 2007/0218329 A1 | 9/2007 | Keith et al. | |
| 2008/0032236 A1* | 2/2008 | Wallace .................. | H01M 6/40 430/319 |
| 2008/0118782 A1 | 5/2008 | Heller et al. | |
| 2008/0187832 A1 | 8/2008 | Takezawa et al. | |
| 2008/0259976 A1 | 10/2008 | Hrudey et al. | |
| 2009/0061090 A1 | 3/2009 | Negishi | |
| 2009/0157369 A1 | 6/2009 | Li et al. | |
| 2009/0217876 A1 | 9/2009 | Epstein | |
| 2009/0304906 A1 | 12/2009 | Suduo et al. | |
| 2009/0326696 A1 | 12/2009 | Wang et al. | |
| 2010/0015361 A1 | 1/2010 | Negishi | |
| 2010/0035152 A1 | 2/2010 | Sastry et al. | |
| 2010/0082142 A1 | 4/2010 | Usadi et al. | |
| 2010/0190051 A1 | 7/2010 | Aitken et al. | |
| 2011/0165326 A1 | 7/2011 | Little et al. | |
| 2011/0202159 A1 | 8/2011 | Wang et al. | |
| 2011/0217578 A1 | 9/2011 | Albano et al. | |
| 2011/0223467 A1 | 9/2011 | Shacklette et al. | |
| 2011/0301931 A1 | 12/2011 | Gering | |
| 2011/0318498 A1 | 12/2011 | Wadley et al. | |
| 2012/0040233 A1 | 2/2012 | Kim et al. | |
| 2012/0058280 A1 | 3/2012 | Chung et al. | |

FOREIGN PATENT DOCUMENTS

| | | |
|---|---|---|
| JP | 6-116722 | 4/1994 |
| JP | 2004-319449 | 11/2004 |
| JP | 2005-93373 | 4/2005 |
| JP | 2005-353759 | 12/2005 |

OTHER PUBLICATIONS

Ceder, G. et al. (Aug. 2002). "Computational Modeling and Simulation for Rechargable Batteries," *MRS Bulletin*, 5 pages.

Chen Y.-H. et al. (2007) "Selection of Conductive Additives in Li-ion Battery Cathodes: A Numerical Study," *Journal of The Electrochemical Society* 154(10): A978-A986.

Doyle, M. et al. (2003) "Computer Simulations of Li-Ion Polymer Battery and Implications for Higher Capacity Next-Generation Battery Designs," *Journal of The Electrochemical Society* 150(6): A706-A713.

Wang, C. et al. (2007) "Mesoscale Modeling of Li-Ion Polymer Cell," *Journal of The Electrochemical Society* 154(11): A1035-A1047.

Zeng, Q.H. et al., (Dec. 3, 2007). "Multiscale Modeling and Simulation of Polymer Nanocomposites," *Progress in Polymer Science* 33(2): 191-269.

Notification of Reasons for Rejection dated Jan. 28, 2014, directed to JP Application No. 2011-514817; 9 pages.

Extended European Search Report dated Jun. 14, 2013, directed to EP Application No. 09767760.3-1353; 13 pages.

European Search Report dated Oct. 11, 2012, directed to EP Application No. 09767761.1; 6 pages.

International Search Report and Written Opinion dated Aug. 24, 2009, directed to International Application No. PCT/US2009/047848; 8 pages.

International Search Report and Written Opinion dated Aug. 7, 2009, directed to International Application No. PCT/US2009/047846; 11 pages.

Wang et al., U.S. Office Action dated Oct. 17, 2012, directed to U.S. Appl. No. 13/086,825; 18 pages.

(56) References Cited

OTHER PUBLICATIONS

Wang et al., U.S. Office Action dated Apr. 26, 2013, directed to U.S. Appl. No. 13/086,825; 17 pages.
Albano et al., U.S. Office Action dated Jul. 6, 2012, directed to U.S. Appl. No. 12/484,966; 9 pages.
Albano et al., U.S. Advisory Action dated Mar. 15, 2013, directed to U.S. Appl. No. 13/103,004; 3 pages.
Albano et al., U.S. Office Action dated Jan. 9, 2013, directed to U.S. Appl. No. 13/103,008; 7 pages.
Sastry et al., U.S. Office Action dated Jan. 20, 2012, directed to U.S. Appl. No. 13/294,980; 10 pages.
Sastry et al., U.S. Notice of Allowance dated Mar. 15, 2013, directed to U.S. Appl. No. 13/648,429; 8 pages.
Sastry et al., U.S. Notice of Allowance dated Aug. 16, 2013, directed to U.S. Appl. No. 13/911,015; 9 pages.
Chung et al., U.S. Office Action dated Nov. 26, 2012, directed to U.S. Appl. No. 13/291,845; 19 pages.
U.S. Office Action dated Feb. 27, 2013, directed to U.S. Appl. No. 13/292,663; 11 pages.
Wang et al., U.S. Office Action dated Aug. 2, 2012, directed to U.S. Appl. No. 13/292,663; 9 pages.
Kim et al., U.S. Office Action dated Oct. 1, 2013, directed to U.S. Appl. No. 13/415,774; 16 pages.
Langlois et al., U.S. Office Action dated Oct. 5, 2015, directed to U.S. Appl. No. 13/653,366; 17 pages.
Langlois et al., Ex Parte Quayle Action mailed Sep. 2, 2016, directed to U.S. Appl. No. 13/653,366; 4 pages.

\* cited by examiner

EMBEDDED SOLID-STATE BATTERY

REFERENCE TO RELATED APPLICATIONS

This application is a continuation of U.S. patent application Ser. No. 13/653,366, filed Oct. 16, 2012, the entire contents of which are incorporated herein by reference. The present invention is related to and incorporates by reference, for all purposes, the following U.S. Pat. No. 7,945,344 and U.S. Patent Publication Nos. 2009-0325063; 2012-0058380; 2012-0055633; and 2012-0058280; and U.S. patent application Ser. No. 13/407,609.

BACKGROUND OF THE INVENTION

This present invention relates to manufacture of electrochemical cells. More particularly, the present invention provides a process and method for manufacturing a solid-state thin film battery device. Merely by way of example, the invention has been described with the use of lithium based cells, but it is recognized that other materials such as zinc, silver, copper, cobalt, iron, manganese, magnesium and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

BRIEF SUMMARY OF THE INVENTION

According to the present invention, a method related to the manufacture of electrochemical cells is provided. More particularly, the present invention provides a method of manufacturing a solid-state thin film battery device. Merely by way of example, the invention has been provided with use of lithium-based cells, but it would be recognized that other materials described above, could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

In a specific embodiment, the present invention provides a procedure for the formation of one or more elements of an electrochemical cell using a complete process.

Benefits are achieved over conventional techniques. Depending upon the specific embodiment, one or more of these benefits may be achieved. In a preferred embodiment, the present invention provides a process for complete deposition of all electrochemical cell materials, including anode, cathode, electrolyte, barriers, stress modifying layers, and embedded current collectors, including combinations thereof.

In particular, it is the ability afforded by this invention to manufacture electrochemical cells without handling individual layers which gives the added benefit of embedded current collectors, allows the formation of a robust product while minimizing parasitic losses of non-energy producing layers and increasing yield due to handling and particulate issues. Specific benefits seen over the conventional art include:

a) The ability to utilize extremely thin layers without subjecting them to stresses and high aspect ratio surface features, such as rollers, in a roll-to-roll continuous process.

b) The ability to manufacture large numbers of stacked battery cells in strip form, allowing for battery capacity to be later determined by the length of the battery cut from the strip.

c) The ability to deposit a smoothing and/or insulating layer between stacked cells of a material, which exhibits a very high etching contrast ratio. This allows the embedded current collectors to be exposed and electrically terminated without physical contact, thus significantly reducing damage and increasing yield.

d) The ability to terminate current collectors both very close together (<0.5 microns) to very far apart (>5 mm) in a single operation.

e) The ability to utilize the termination itself for adhesion to the battery, and not add any stress to the current collectors, thus improving performance and yield.

f) The ability to optimize the volume and mass of the terminations and gain the maximum energy density per battery. This is particularly true in batteries that are small as would be used in electronic communications and handheld devices.

g) The ability to optimize the margin, as defined as the distance between anode and cathode layers and current collectors in plane, by a post deposition process and not burden the manufacturing process with extreme tolerance positioning of layers. This is especially true for batteries with a high number of layers and relatively thick total height.

h) The ability to make extremely low impedance connection to very thin current collectors due to the vacuum deposited nature of the termination process and the ability to connect to the entire length of the current collector.

i) The ability to tailor the materials of the termination to have components that provide adhesion, low electrical impedance, robustness, solderability, weldability, and the like.

j) The ability to utilize an insitu ablation process, such as laser, brush, ion beam, wheel, roller, scraper, and the like in place of a shadow mask to delineate conductors and or other layers of the electrochemical device.

It is further understood that the method itself may be a combination of methods and may affect the electrochemical properties of the thin film, and may be the cause of significant improvements in ionic conductivity, electrical resistivity, contact resistance, and the like; all of which are incorporated herein.

Depending upon the specific embodiment, one or more of these benefits may be achieved. Of course, there can be other variations, modifications, and alternatives.

The present invention achieves these benefits and others in the context of unique and non-intuitive process technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
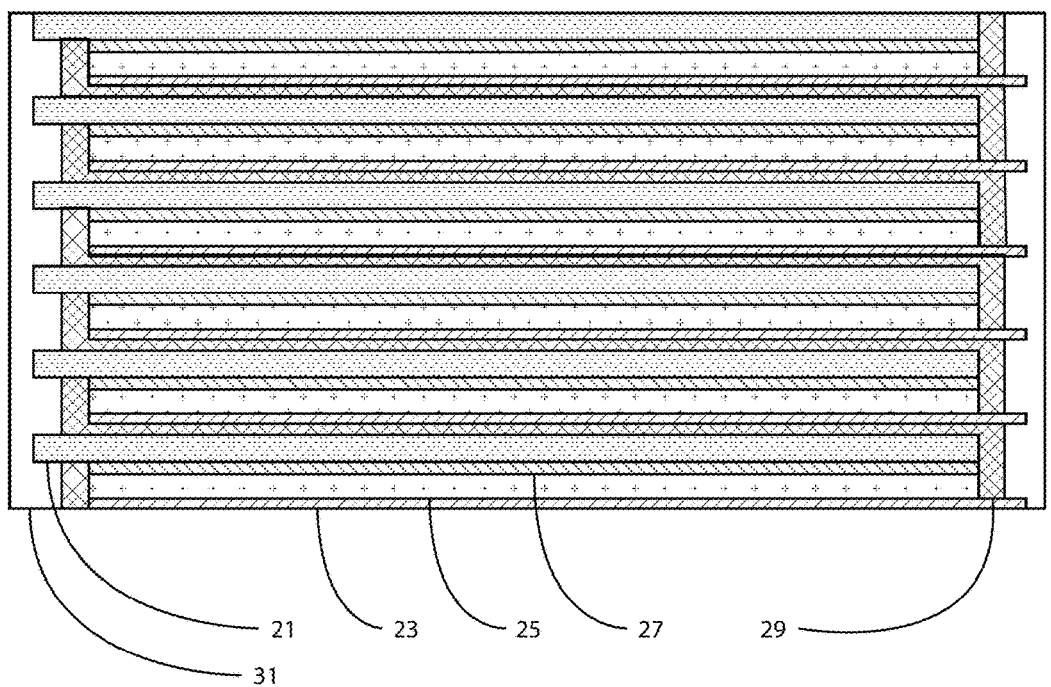
FIG. 1 is a cross-section of an electrochemical cell.

Lithium ion batteries must occupy substantial three-dimensional volumes to be useful. By way of example, those used in the Apple iPhone 4® and the GM Volt® achieve this usefulness by being deposited on a web or flexible substrate and stacked or wound with separator webs and current collector webs to form a size and electrical performance suitable for use. The wound or stacked devices are then terminated by a number of means, all of which use an excess of space and weight to compensate for small area electrical connections due to manufacturing problems associated with termination along the entire length of the current collectors.

As for solid-state technology, those in the field have attempted to build multi-layer, or stacked solid-state batteries, deposited one upon the other, but have been limited to only a single layer of cells due to manufacturing problems. These manufacturing problems include the difficulties of building multiple stacks one upon the other without transmitting defects and systematically increasing the roughness of layers or stress in the layers. Another inherent problem is the termination of a large number of opposite polarity, extremely thin current collectors in a minimum space with minimum weight and with the robustness required for commercial applications. The thin film batteries thus far produced are severely limited in energy and usefulness, and are not readily scalable.

Those skilled in the art have been unable to manufacture thin film solid-state batteries useful in replacing conventional technology, particularly those batteries for extended use in consumer electronics or in automobiles.

One of the advantages of thin film solid-state batteries is their ability to be manufactured in precision sufficient to allow large numbers of parallel cells to form higher energy density devices without the detrimental effects often seen in conventional technology. These detrimental effects include: breakdown of the liquid dielectric, growth of films at the anode and cathode interface to the dielectric, dendrite growth of the anode materials, spot heating at particles and shorting. As noted above, the physics of the conventional state of inorganic materials useful in solid-state batteries overcomes almost all of these detrimental effects except for the very thin layers required to operate at charge and discharge rates that are useful. This, in turn, leads to vast numbers of these very thin cells being connected in parallel. Furthermore, the subsequent manufacturing requirements of terminating this high number of current collectors, whose thicknesses can be in the range of 100 to about 5000 Angstroms, onto terminals that can carry 10's of amps are extremely difficult. These very thin layers play an important role in the superior energy density of solid-state batteries, as the volume and mass they contribute is very minor; however, this same benefit represents a major manufacturing problem due to their delicate nature. Added to these issues is the need for extreme robustness both physically and electrically, and the not insubstantial requirement to minimize the mass and size of the terminations. The conventional state of the art utilizes shaped current collectors ending in tabs, which contact only a portion of the width of the current collector. This can have serious deleterious effects on the interface impedance between the current collector and the termination. In fact, a substantial number of battery pack failures have been traced to poor terminations.

Another manufacturing problem with solid-state batteries is the glass or ceramic nature of the cathode and electrolyte. These films are thin and brittle having little strength, especially in tension. Submicron sized defects, especially in the electrolyte layer, can cause performance degradation or complete failure. Consequently, handling of these layers of thin films presents great challenges in product quality.

Further, in order to realize the true high energy density potential of solid-state batteries, little volume and mass can be given over to the type of bulky terminations and packaging used in present commercial batteries. What works for conventional wet technology does not make economic sense for solid-state.

Therefore, when designing a product and process for the manufacture of solid-state batteries, one must include all aspects of what is inside of the package, how the cell itself is shaped and how it is terminated. This is especially true of multilayer stacks of thin films with multiple different materials and high numbers of layers. This invention relates to a non-intuitive process of manufacturing robust multilayer electrochemical cells.

Referring to U.S. Pat. No. 7,945,344 and U.S. Patent Publication Nos. 2009-0325063; 2012-0058380; 2012-0055633; and 2012-0058280; and U.S. patent application Ser. No. 13/407,609, all assigned to Sakti3, Inc., and incorporated by reference herein, we teach that the optimum design for energy density includes electrochemical cells with multiple repeating layers, thin current collectors, strategically placed smoothing layers and monolithic embedded terminations.

According to the present invention, methods related to the manufacture of electrochemical cells are provided.

One element of the invention relates to the ability to planarize the cross-section of the battery itself, compensating for the difference in step height caused by margins (as defined above and created by masking or by removal).

A further element of the invention pertains to the ability to protect both layers and terminations from physical damage during the manufacturing process; this is the direct and inherent benefit of encapsulating all layers into a monolithic design.

A further element of the invention pertains to the ability to utilize multiple deposition sources for the simultaneous deposition or manufacturing of layers, thus significantly decreasing the manufacturing time, output per capital dollar invested, and cycle time per batch.

Yet a further element of the invention results in the ability to manufacture stacked solid-state batteries, in numbers greater than 1000, without touching the layers.

A further element of the invention, made possible by the above feature, is the ability to optimize energy density by controlling the parasitic volume and mass associated with margins, terminations, and substrates.

A unique element of the invention is the non-intuitive ability to manufacture a complete multi-layer solid-state battery in a single operation and vacuum step, thus significantly reducing the manufacturing cost and increasing the product quality and yield.

Yet another novel element of the invention is the ability to deposit multiple strips of batteries of different widths and lengths thus creating finished batteries suitable for multiple customers and purposes in a single machine cycle. Further, it is a unique ability to easily change process adjustment or subcomponents and optimize manufacturing parameters for individual product needs.

Examples enabled by the invention include, but are not limited to, varying the amounts of cathode to anode material throughout the thickness of a combination or multi-deposited depleted cathode layers, graded index or modulus films for the control and tailoring of stress or temperature and the control of their gradients.

As further described and illustrated in FIG. 1, the elemental steps provided by this invention are as follows. Referring to FIG. 1, describing a preferred embodiment of the invention particularly unique and useful for the manufacture of electrochemical cells. FIG. 1 is a cross-section of an electrochemical cell depicting several key components of this invention.

Item 23 refers to the cathode current collector layer, item 25 refers to the cathode layer, item 27 refers to the electrolyte layer, and item 21 refers to the anode layer. Variations of this arrangement may include an anode current collector layer disposed directly on top of the anode layer shown, coating an anode or a cathode on both sides of their respective current collectors, with or without an intermediate layer.

Items 21 and 23, again depicting the anode and cathode current collectors respectively, are shown to protrude from the stack of layers in general. Notice item 31, which is symmetrical on both sides of the electrochemical stack. This item is the termination which connects in parallel all protruding anode and all protruding cathode current collector layers into a low impedance construct allowing direct connection to the electrochemical cell by spring loaded contact, soldering, welding, conductive materials, and the like.

Paying particular attention to item 29 we illustrate the smoothing and insulating layer described in detail above. It is noted that the etching contrast of this material against the anode and cathode current collector is very high in the presence of plasma-assisted or chemical etching.

Figure 2:
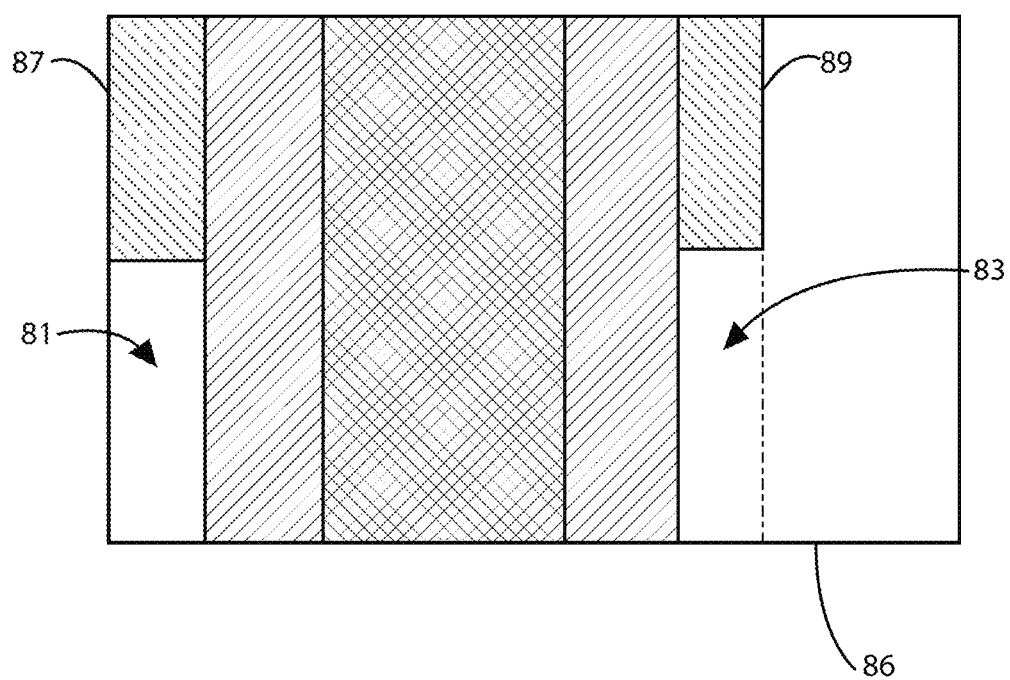
FIG. 2 is a drawing showing removal a portion of the deposited material at the edge of the layer.

In another preferred embodiment, as depicted in FIG. 2, item 29 in FIG. 1 above would not be necessary if the alternating margins of the anode and cathode layers are produced by removal.

As shown in FIG. 2, item 86 depicts the belt or drum of the deposition tool described herein. On that belt or drum are coated multiple layers of electrochemical materials forming the product. Here it can be seen that items 81 and 83 refer to the belt or drum or underlying layers where a portion of a layer 87 and 89 respectively are removed, as by laser ablation or other methods described above.

This embodiment has several advantages over shadow masking and filling as described in FIG. 1. Among these advantages are: ability to produce a sharp and precise edge not effected by the mean free path of the deposition material, ability to dynamically align the removed material via an optical feed-back mechanism, such as a camera, the ability to manufacture these margins in exceedingly thin sections, between 1 and 100 microns, thus allowing for the optimization of energy density not attainable by other manufacturing means.

Figure 3:
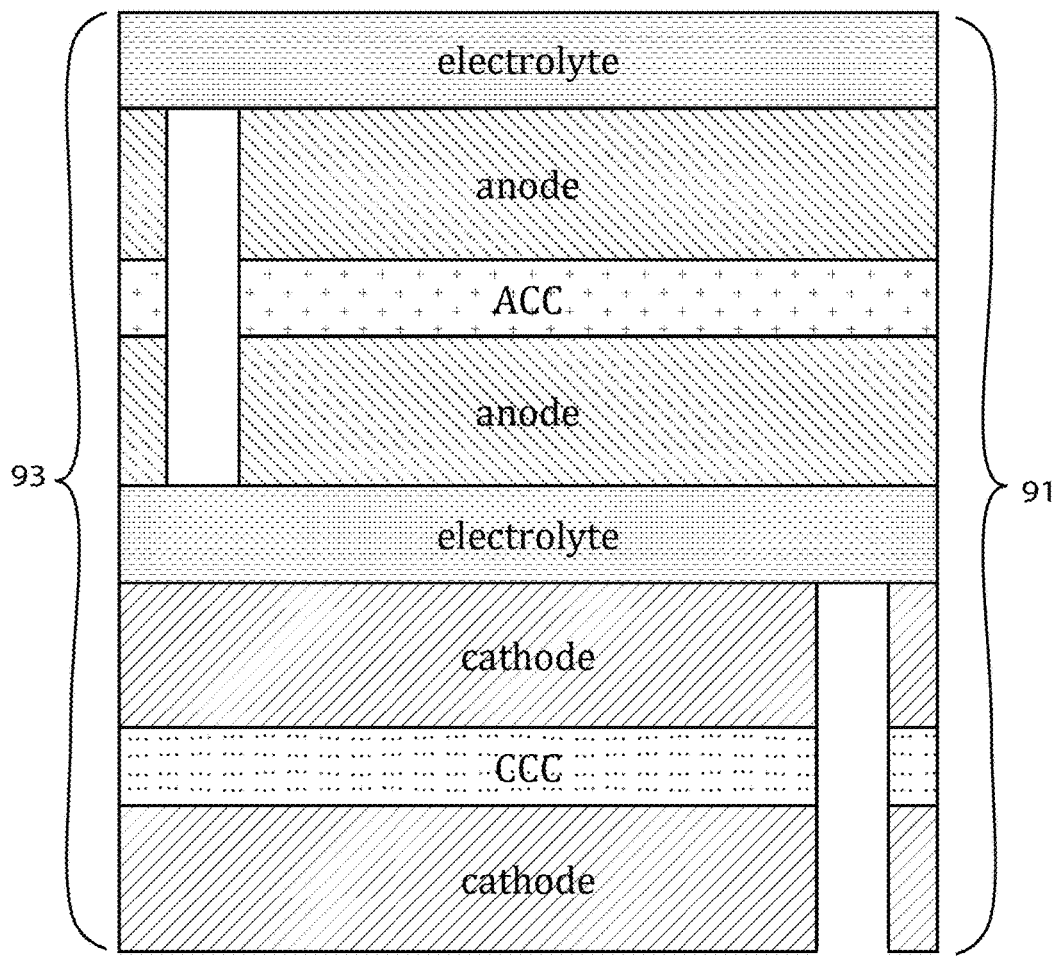
FIG. 3 is a schematic showing a cross-section of an electrochemical cell in which portions of the layers have been removed to facilitate termination.
Figure 4:
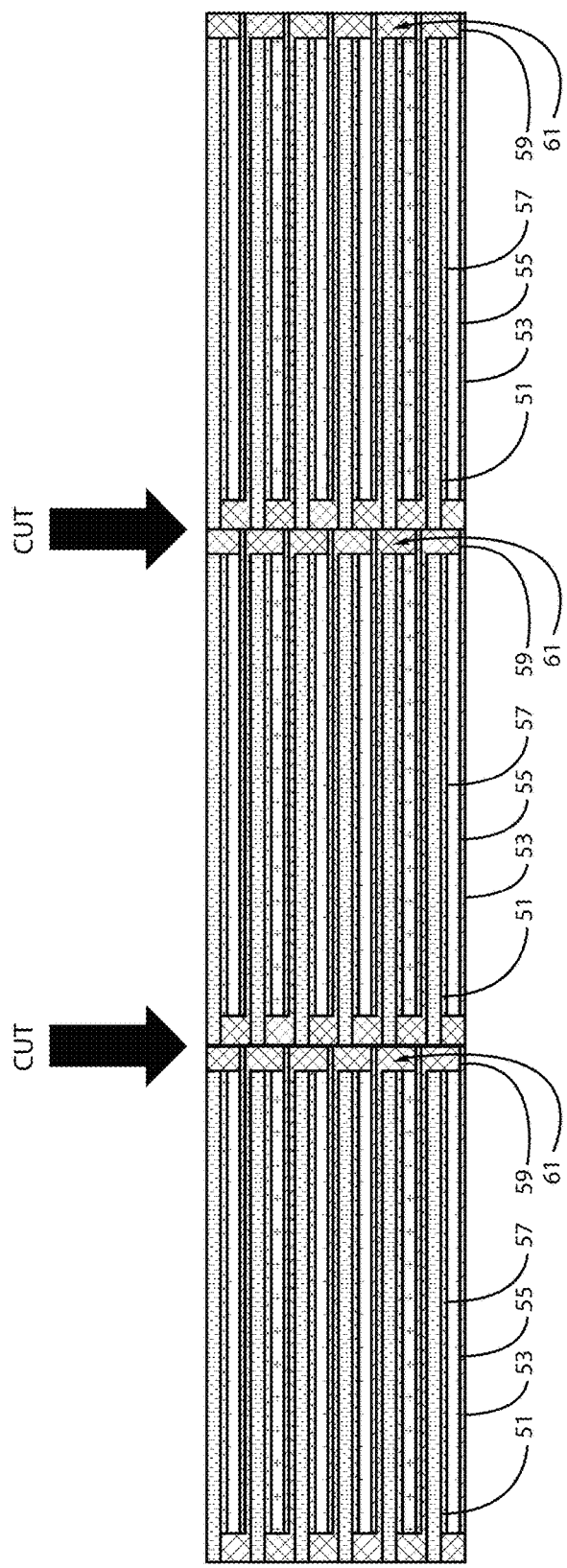
FIG. 4 is a cross-section of an electrochemical cell depicting the cutting of an electrochemical cell into smaller strips.

As illustrated in FIG. 3, the use of removal or ablation techniques, such as a laser, allows for the margin to be created and to preserve a solid layer edge to present to the termination operation but still separate the terminations of anode and cathode on, for example, each side of the cell. In FIG. 3 above terminations made over the full surface of the cell edge depicted by item 91 results in contact to the anode and/or its associated current collector, and terminations made over the full surface of the cell edge depicted by item 93 results in contact to the cathode and/or its associated current collector. As shown in FIG. 4, it is possible to retain all of the beneficial features of this invention with this embodiment including cutting individual strips from the main strap, terminating them, and then cutting each strip into individual battery products.

Referring now to FIG. 4, we depict the strap of electrochemical cells as a cross-section in the cross machine direction. Here we illustrate a similar layer structure to FIGS. 1 and 2 where item 51 is a cathode current collector, item 53 is a cathode layer, item 55 is an electrolyte layer, item 57 is an anode layer and item 61 represents the leveling-smoothing layer of high etch ratio.

It will be noticed that three strips of electrochemical cells are depicted, however, it is the intention of this invention to include multiples of strips, both equal in width and different in width as explained in detail above. The arrows are shown at the place were separation of the strips is performed. After separation, the individual electrochemical strips would resemble FIG. 2, and after plasma or chemical etching and termination, FIG. 1; hence, these figures depict the complete process of producing the strap of electrochemical devices composed of strips to be separated, and etched and terminated.

It is also contemplated by this invention that the bottom and top of the strap may be preferentially coated or covered by a barrier layer; thus affording a high degree of integrity to the then separated electrochemical cell.

It is further contemplated by this invention that the number of alternate layers may be in other arrangements, including Cathode Current Collector, Cathode, Electrolyte, Anode, Cathode, Cathode Current Collector as a repeating MER.

It is further contemplated by this invention that the number of alternate parallel electrochemical cells may be as few as one and as numerous as several thousand.

Figure 5:
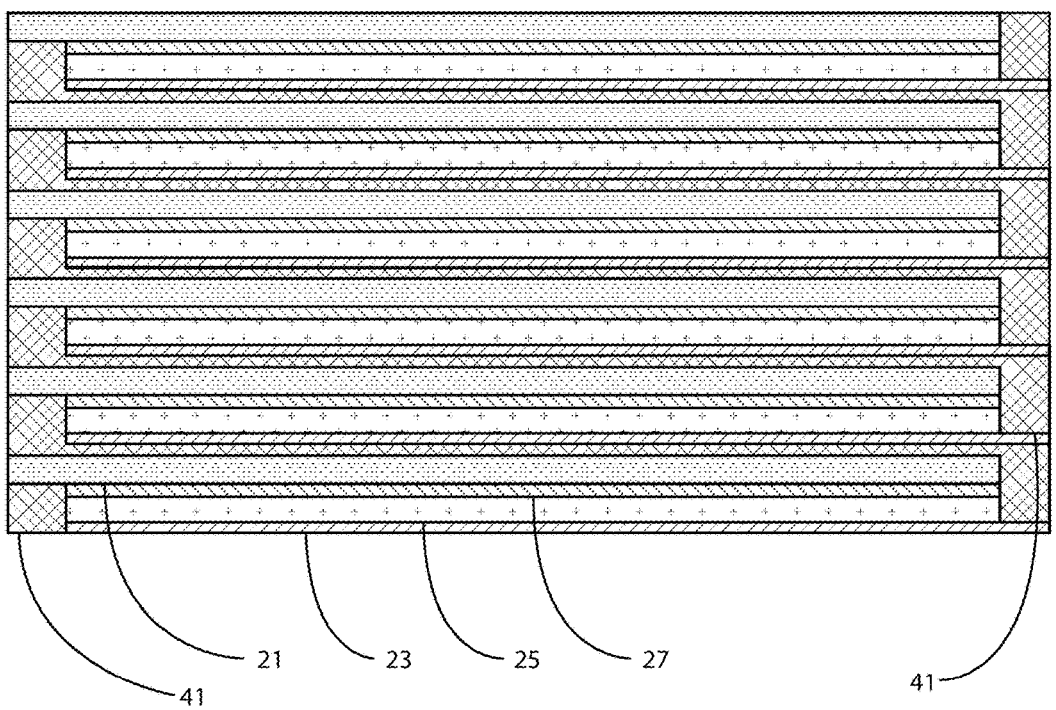
FIG. 5 is a cross-section of an electrochemical cell with a smoothing layer deposited over the edge.

Referring now to FIG. 5, depicting an electrochemical cell made according to one embodiment of this invention. As described above for FIG. 1, the cell includes anode layers 21, cathode current collector layers 23, cathode layers 25, and electrolyte layers 27. In this depiction, the leveling—smoothing layers items 41 are shown prior to plasma etching. In this depiction it is shown how the thin layers needing to be electrically connected in parallel are supported by complete embedding within the structure.

Figure 6:
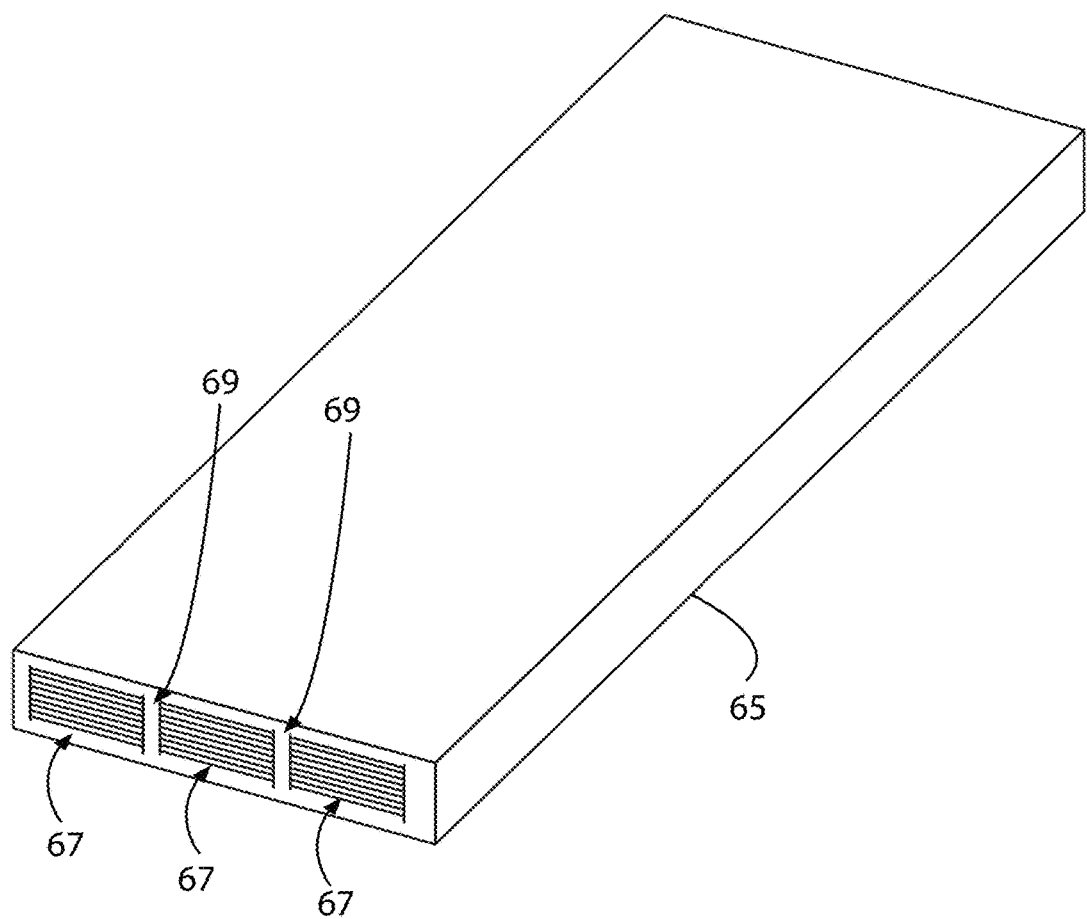
FIG. 6 is a drawing of a strap of embedded electrochemical cells.

Turning now to FIG. 6, item 65 illustrates the strap of embedded electrochemical cells removed from the substrate transport device, i.e. drum, strap or sheet. Item 67 indicates the rows of stacked cells in the machine direction. Item 69 indicates the locations where the strap is to be separated into sub-strips according to the present invention. By way of illustration only, three sub-strips are depicted, but it is envisioned by this invention that many sub-strips may be manufactured in a strap, and that different width sub-strips may be simultaneously manufactured. This, combined with the inherent ability to separate the sub-strips into different lengths, provides the ability to manufacture many size and shapes of electrochemical devices in one step.

Figure 7:
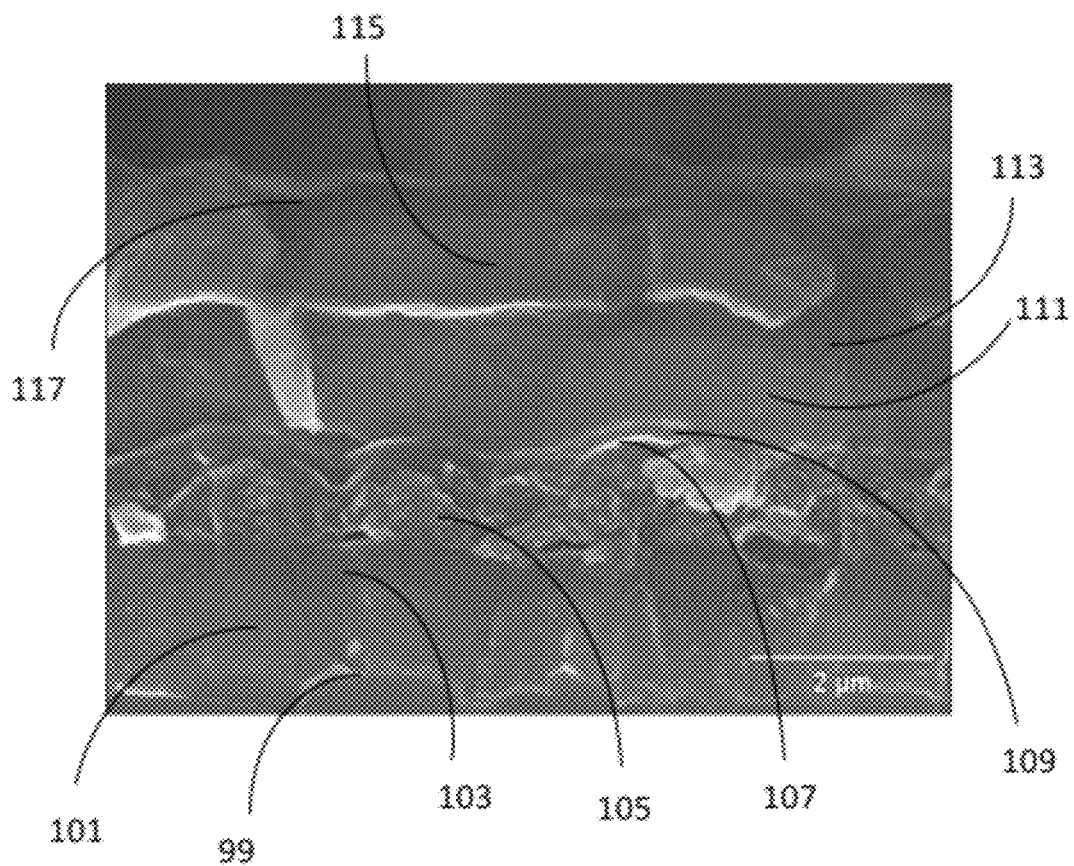
FIG. 7 is a scanning electron microscope image of the cross-section of a multilayer cell.

By way of example of one embodiment of the invention, FIG. 7 shows a scanning electron microscope image of the cross-section of multilayer cells separated by polymer interlayers, deposited according to one method of the current invention. The layers as indicated in FIG. 7 are composed of:

1. Item 99 Cell 1 current collector;
2. Item 101 Cell 1 cathode;
3. Item 103 Cell 1 electrolyte;
4. Item 105 Cell 1 anode;
5. Item 107 Polymer interlayer;
6. Item 109 Cell 2 current collector;
7. Item 111 Cell 2 cathode;
8. Item 113 Cell 2 electrolyte;
9. Item 115 Cell 2 anode; and
10. Item 117 Polymer interlayer.

Figure 8:
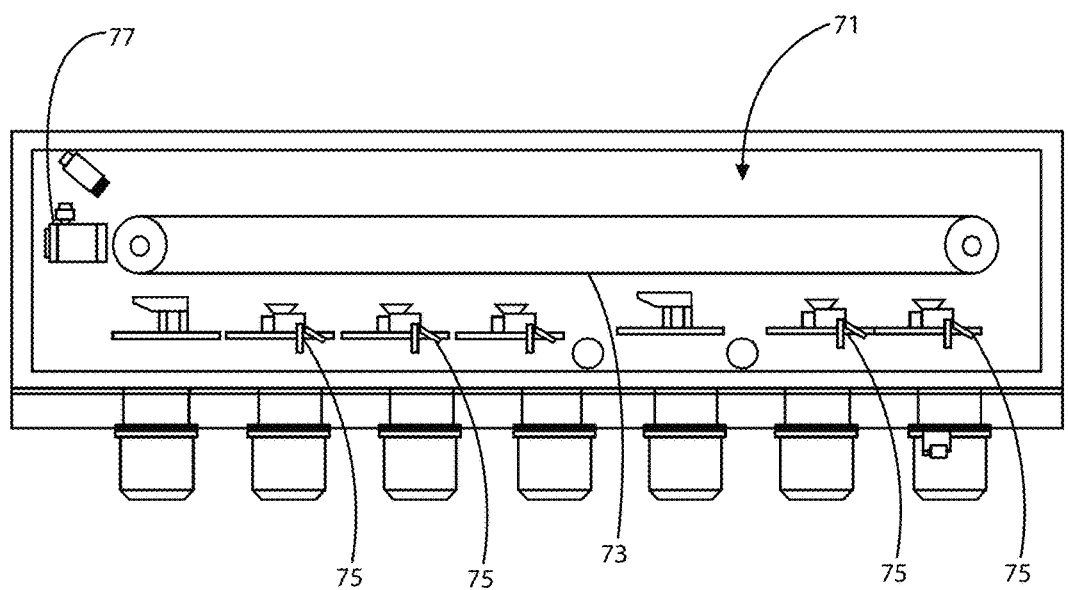
FIG. 8 is an apparatus for manufacturing the embedded solid-state battery device.

As depicted in FIG. 8, the apparatus for manufacturing the present invention is illuminated. Although it has been described in U.S. Pat. No. 7,945,344 and U.S. Patent Publication Nos. 2009-0325063; 2012-0058380; 2012-0055633; and 2012-0058280; and U.S. patent application Ser. No. 13/407,609, all assigned to Sakti3, Inc., which are incorporated by reference herein, we present this information to help illustrate the fullness of the invention.

Turning to item 71, we see a vacuum chamber enclosing all of the processing equipment. For illustration purposes only, a rectangular chamber is shown, but also suitable and contemplated by this invention are round, square, and other shapes, and multiple discrete chambers separated by load locks. Contained within this processing chamber are several PVD deposition sources (item 75). Again, these deposition sources have been described in full in U.S. Pat. No. 7,945,344 and U.S. Patent Publication Nos. 2009-0325063; 2012-0058380; 2012-0055633; and 2012-0058280; and U.S. patent application Ser. No. 13/407,609, all assigned to Sakti3, Inc., which are incorporated by herein and are used for illustrative purposes as other deposition devices and arrangements are contemplated by this invention.

Item 73 illustrates a revolving belt upon which the present invention is manufactured. Again, by way of illustration, a roll-to-roll arrangement, a rotating drum, or a linear movement of plates of substrates may be substituted. The belt is shown in a horizontal configuration, but again by way of illustration the drum or sheet or plate may be horizontal or vertical or any angle that is required to optimize the manufacturing of the present invention. Finally, item 77 depicts the evaporation and energy curing of the substantially acrylated organic monomer integral to this invention. Here we see this item mounted to the left side of the belt substrate transport device, but in full contemplation of this invention other locations may be more advantageous.

It can be seen how the application of the evaporated organic monomer is directed and condensed on the substrate transport. Control of the substrate temperature is a key process parameter of this invention with temperatures between about 3 degrees C. and 17 degrees C. most useful. High performance di- and tri-acrylate monomers or a mixture of the same are atomized in an ultrasonic nozzle and evaporated and condensed on the substrate. By way of example, the monomer or mixture of monomers may include tripropylene glycol diacrylate, trimethylolpropane triacrylate, dodecanediol dimethacrylate. The mixture may also include initiators for curing of the condensed material. Curing can be achieved by a number of means including but not limited to electron beam, ion beam, UV, xenon lamp, or thermal treatment.

So finally, it can be fully understood and envisioned that this invention is unique and non-intuitive for the manufacturing of thin film solid-state battery cells and devices. By rotating the belt, in this instance, various layers may be simultaneously deposited through a number of masks to deposit delineated strips of electrochemical thin film layers. Upon condensation and cross linking of the organic monomer, these strips of layers are planarized and embedded into a solid matrix of organic and inorganic materials of certain thicknesses and in certain positions. The process may simply be continued, or repeated, until the necessary number of device cells or layers is deposited.

As detailed above, later process steps outside or inside of the same process chamber, or chambers is used to separate, preferentially etch, or remove a portion of the embedded organic polymer exposing the integrated anode and cathode current collectors, allowing for a PVD termination layer or layers to be applied. Additional steps outside the chamber may include additional processes using the same or similar essentially acrylate polymer for further enclosing or stacking the stacks of layered cells. This process may require different monomer mixtures or curing processes due to the change in environment. Thus completing the battery device and making it ready for testing, packaging and sale.

Conventional practice does not address these needs or unique solutions in multilayer solid-state batteries. Therefore presented below is an Encapsulated Solid-State Battery and Method of Manufacture.

1. Deposit with a single, continuous vacuum process, a strap or substrate containing all layers necessary for a useful and valuable solid-state battery suitable for replacement of existing battery technology. This deposition may contain any combination of masking or removal to achieve delineation of individual layers.
2. Remove the strap from the vacuum coater.
3. Cut the strap into strips.
4. Terminate the strips by any number of means including: etching back of insulating materials, plating, shooping, vacuum depositing, metal spraying, dipping, roller coating, and the like with a conductive material.
5. Cut the strips into individual batteries.
6. Add electrically conductive leads.
7. If required, stack and combine the cells in a series or parallel to obtain the required voltage or current capability and then package the battery by any number of means including: sealing into a pouch, metal package, plastic package or other pre-formed enclosure, dipping, spraying, or otherwise coating in a suitable liquid compound, then curing or hardening the compound.

8. Using as a finished battery product.

Figure 9:
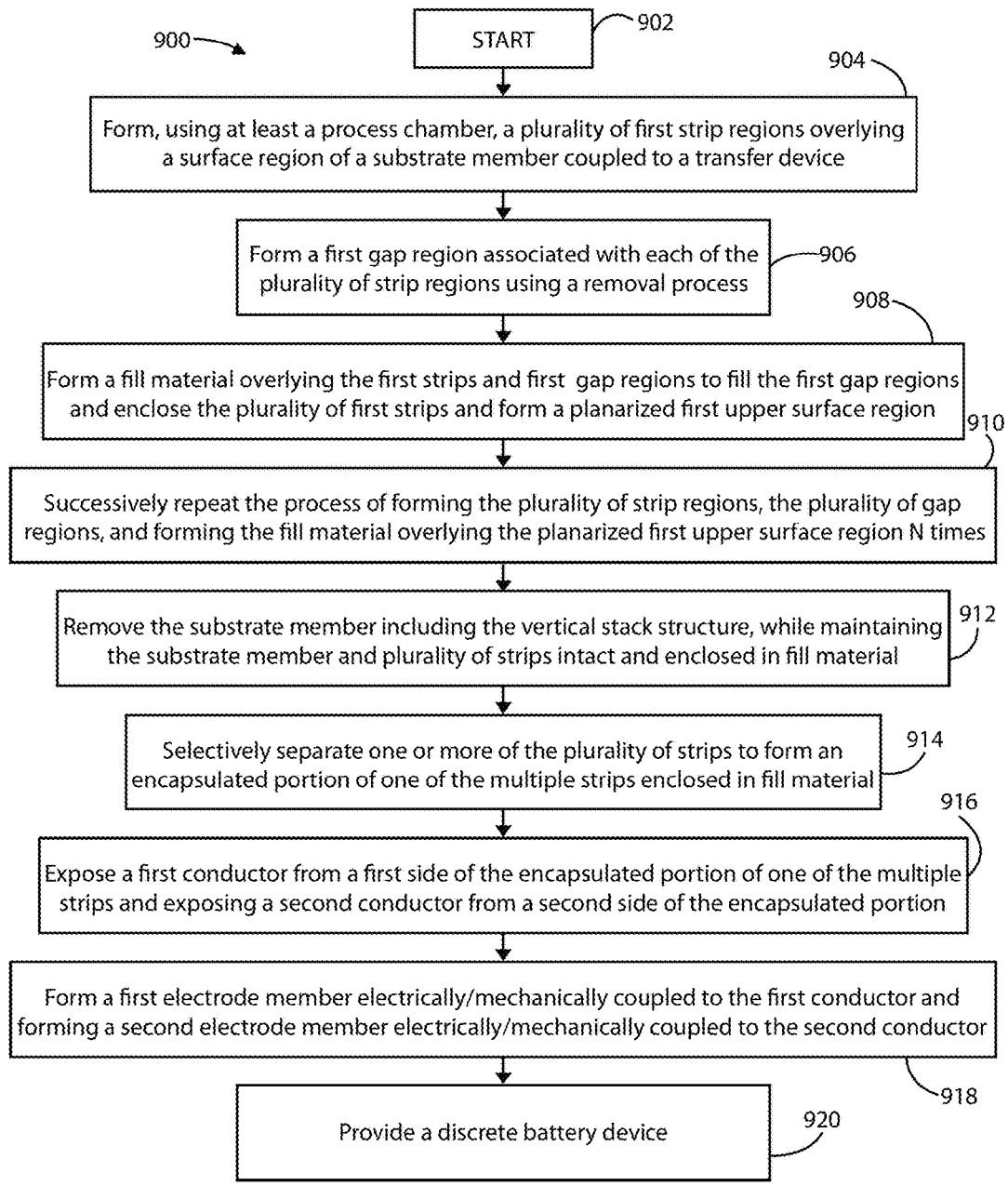
FIG. 9 is a simplified flow diagram illustrating a method according to an embodiment of the present invention.

A method for manufacturing a battery device is outlined as follows, referring also to method 900 of FIG. 9.

1. (step 902) Start;
2. (step 904) Form using at least a process chamber, a plurality of first strip regions overlying a surface region of a substrate member coupled to a transfer device, the transfer device being selected from at least one of a drum device, a roll-to-roll device, a plate device or a belt device, each of the first strip regions comprising a stack of thin film electrochemical devices, each of the thin film electrochemical devices comprising at least an anode material, a cathode material, and an electrolyte material, the plurality of first strip regions being configured in a first direction along a length of the surface region of the substrate and being normal to a second direction, the second direction being normal to the first direction;
3. (step 906) Form a first gap region associated with each of the plurality of strip regions using a removal process, each of the plurality of first strip regions having a first thickness above the surface region, the removal process being selected from one of a shadow masking removal or ablation process or a laser ablation process to cause formation of a plurality of strips configured with the plurality of first gap regions, each of which is separating a pair of strips;
4. (step 908) Form a fill material overlying the plurality of first strips and plurality of first gap regions to substantially fill each of the first gap regions and substantially enclose each of the plurality of first strips and forming a planarized first upper surface region overlying the plurality of strips;
5. (step 910) Successively repeat the process of forming the plurality of strip regions, the plurality of gap regions, and forming the fill material overlying the planarized first upper surface region N times, where N is an integer greater than two (2) to form multiple plurality of strips configured as a vertical stack structure enclosed in the fill material overlying the substrate member;
6. (step 912) Remove the substrate member including the vertical stack structure including the multiple plurality of strips from the transfer device, while maintaining the substrate member having the multiple plurality of strips intact and enclosed in fill material;
7. (step 914) Selectively separate one or more of the plurality of strips to form an encapsulated portion of one of the multiple strips enclosed in fill material;
8. (step 916) Expose a first conductor from a first side of the encapsulating portion of one of the multiple strips and exposing a second conductor from a second side of the encapsulating portion of one of the multiple strips;
9. (step 918) Form a first electrode member electrically and mechanically coupled to the first conductor and forming a second electrode member electrically and mechanically coupled to the second conductor; and
10. (step 920) Provide a discrete battery device.

As shown, the present method includes one or more of the above sequence of processes. Variations to the processes also exist. For example, the forming of the first electrode member and the second electrode member are provided by at least one of vacuum deposition, plating, thermal spraying, dipping, coating, air or airless spraying or brushing. The fill material for the first planarized upper surface region comprises an acrylated monomer or mixture of a plurality of monomers and curing initiators with a viscosity measured in cps at 20 degrees Celsius between about 0.6 and 600. The fill material is characterized as an electrical insulator deposited by at least one of PVD, CVD, PECVD, flash evaporation, thermal evaporation, electron beam evaporation, RF or DC or pulsed DC or mid frequency magnetron sputtering, or high power pulsed magnetron sputtering HPPMS. The exposing comprises an etching process, the etching process being at least one of a liquid etchant to selectively etch an anode current collector or a cathode collector or a plasma or plasma with ion assist including at least one background gas, the background gas being at least one of Argon, Oxygen, Nitrogen, Helium, $CF_6$, $CF_4$, $CH_4$, $SF_6$, H, and/or combinations thereof.

In an example, the separating process uses at least one of a diamond saw, diamond wire saw, carbide saw, tool steel saw, water jet, laser, ultrasonics, knife blades, scoring, breaking, punching, shearing, heat, cryogenics, etching and their combinations. In an example, any of the above steps, and others described herein, further include attaching an active or passive electrical device to the discrete battery device, the electrical device being at least one of a pin or socket, electrical energy transmission device, parallel or serial data transmission device, LED, fluorescent lamp, incandescent lamp, electroluminescence lamp, digital display, analogue display, sound producing device, vibration producing device, digital memory device, solar cell, heat producing device, thermistor or thermocouple, pressure sensing device, humidity sensing device, magnetism sensing device, acceleration sensing device, gravity sensing device, pH sensing device, blood sugar sensing device, odor sensing device, optical sensing device, x-ray sensing device, gamma ray sensing device, electric charge sensing device, MEMS based device, monolithic silicon analogue or digital device, energy management device, diode, transistor, resistor, capacitor, inductor, antenna, or RFID device.

In an example, the first electrode member and the second electrode member are made using a conductive material from as least one of Chromium, Nickel, Monel, Titanium, Silver, Gold, Aluminum, Copper, Zinc, Tantalum, Tin, Iridium, Palladium, Tantalum, or their alloys, and nitrides. The conductive material is provided using at least one of electroplating, electroless plating, PVD, CVD, Plasma assisted CVD, sputtering, bias sputtering, ion assisted deposition, arc deposition, flame and plasma spraying, dipping, painting, ink jet printing, roll coating, or combinations thereof. The first electrode member and the second electrode member are characterized by an adhesion factor to the first conductor and the second conductor, the adhesion factor being greater than 0.05 pounds per square inch. Each of the first conductor and the second conductor has greater thickness region within a vicinity of a termination with the first electrode member or the second electrode member.

In an example, one or more of the plurality of strips are configured with one or more different widths and/or lengths to form one or more different discrete battery devices. The plurality of strip regions is characterized by greater than 1000 strips in parallel arrangement.

Additionally, the method can also provide at least one function enhancement region configured between any pair of strips or between any one of the strips and the surface region or overlying an upper strip region or covering a entire three-dimensional shape of the one or more strips. As an example, the function enhancement region being provided:

to increase resistance to environmental degradation;
to decrease lithium diffusion;
to increase resistance to scratching;

to increase resistance to solvents;
to enhance printing ink adhesion;
to provide color;
to provide gloss;
to provide reduced odor transmission;
to provide thermal protection;
to enhance thermal transfer;
to help constrain expansion;
to provide a gettering function to moisture;
to provide a gettering function to oxygen;
to provide a gettering function to nitrogen;
to enhance tolerance to thermal shock;
to enhance resistance to or transmission of EMI interference;
to minimize stress;
to provide temporary adhesion for improvement of secondary manufacturing steps;
to increase the frictional coefficient of the outer layer to increase ease of handling in assembly, packaging and use;
to provide a removable protective layer to temporarily increase protection during storage, handling or WIP;
to provide temporary electrical insulation of the battery device terminals; or
to provide adhesion of one stack of battery devices to another stack of battery devices or to a package in a separate down stream process, and any combinations of the above.

In an example, the function enhancement region composed of at least one of PCTFE, PVdC, epoxy compound, silicone compound, acrylate compound, urethane compound, BUNA, cellulose compound, block co-polymers, PET, PEN, PE, HDPE, UMWPE, enamel compound, SiOx, Al2O3, SiOxNx, TiNx, TaNx, TaOx, glyptol, mica, Mylar, natural rubber compound, or neoprene compound, or combinations thereof, and the like.

In various embodiments, the method can include a method for the manufacture of a solid-state electrochemical device using at least a high speed evaporation process. The method can include using a computed and engineered set of spatial dimensions for each layer thickness measured out of plane, for margins, measured in plane between dissimilar conductors and a termination, and for the termination layers where each dimension is optimized for energy density of the electrochemical cell. The margin can be between about 5 and 100 microns, where the layer thicknesses are between about 0.01 and 25 microns. The energy capacity can be between 150 mAh and 50 Ah or the energy density is greater than 600 Wh/L. The engineered set of spatial dimensions may be described in one or more of the following, including U.S. Pat. No. 7,945,344 and U.S. Patent Publication Nos. 2009-0325063; 2012-0058380; 2012-0055633; and 2012-0058280; and U.S. patent application Ser. No. 13/407,609, each of which is incorporated by reference, and all assigned to Sakti3, Inc.

In various embodiments, the method can include forming multiple thin layers of solid-state materials comprising an electrochemical cell resilient in bending and substantially environmentally protected from an ambient factory environment. The forming of the multiple thin layers of solid state materials can be further processed in the factory environment free from an exterior packaging designed to maintain the multiple thin layers of solid state materials free from contaminants. The multiple thin film layers of solid state materials can be shaped to conform to fit within an individual packaging to increase an energy density for an end use product or a completed electrochemical cell or alternatively forming the multiple thin layers of solid state materials directly onto a package of a consumer device or industrial device, the consumer device or the industrial device being one of a cell phone, computer tablet, laptop PC, or automobile. The completed electrochemical cell has a moisture ingress rate of less than $3\times10^{-4}$ gm/m$^2$/day.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for manufacturing of a solid-state battery device, the method comprising:
   forming a plurality of strips overlying a substrate coupled to a roll-to-roll device, each of the strips comprising a stack of thin film battery devices, each of the thin film battery devices comprising an anode material, a cathode material, and a solid state electrolyte material, the strips being configured in a first direction along a length of the substrate, and the strips being normal to a second direction;
   forming a first gap region associated with each of the plurality of strips using a laser ablation removal process, the first gap region separating adjacent strips;
   providing a fill material overlying the plurality of strips and filling the first gap regions; the fill material enclosing each of the plurality of strips and planarizing the surface region of the plurality of strips to provide a first upper surface;
   repeating the forming process to provide a further plurality of strips, each of the further plurality of strips comprising a stack of thin film battery devices having a plurality of gap regions with fill material, such that the further plurality of strips overlies the first upper surface, the forming process being repeated to provide a vertical stack structure;
   selectively separating one or more of the plurality of strips in the vertical stack structure to form an encapsulated portion of one of the plurality of strips enclosed in the fill material; and
   exposing a first conductor to a first side of the encapsulating portion and exposing a second conductor to a second side of the encapsulating portion.

2. The method of claim 1, wherein a first and second electrode are formed on the first and second conductor respectively via vacuum deposition, plating, thermal spraying, dipping, coating, air or airless spraying/brushing.

3. The method of claim 2, wherein the first and second electrodes are made using a conductive material from as least one of Chromium, Nickel, Monel, Titanium, Silver, Gold, Aluminum, Copper, Zinc, Tantalum, Tin, Iridium, Palladium, Tantalum, or their alloys, and nitrides, the conductive material being provided using at least one of electroplating, electroless plating, PVD, CVD, Plasma assisted CVD, sputtering, bias sputtering, ion assisted deposition, arc deposition, flame and plasma spraying, dipping, painting, ink jet printing, roll coating, or combinations thereof.

4. The method of claim 2, wherein the first and second electrode are characterized by an adhesion factor to the first conductor and the second conductor respectively, the adhesion factor being greater than 0.05 pounds per square inch.

5. The method of claim 2, wherein each of the first conductor and the second conductor has a greater thickness region within a vicinity of a termination with the first electrode member or the second electrode member.

6. The method of claim 1, wherein the fill material for the first planarized upper surface region comprises an acrylated monomer or mixture of a plurality of monomers and curing initiators with a viscosity measured in cps at 20 degrees Celsius between about 0.6 and 600.

7. The method of claim 1, wherein the exposing step is an etching process, the etching process being at least one of a liquid etchant to selectively etch an anode current collector or a cathode collector or a plasma or plasma with ion assist including at least one background gas, the background gas being at least one of Argon, Oxygen, Nitrogen, Helium, $CF_6$, $CF_4$, $CH_4$, $SF_6$, H, and/or combinations thereof.

8. The method of claim 1, wherein the plurality of strips comprises greater than 1000 thin film battery devices connected in a parallel arrangement.

9. The method of claim 1, wherein the fill material is an electrical insulator deposited by at least one of PVD, CVD, PECVD, flash evaporation, thermal evaporation, electron beam evaporation, RF or DC or pulsed DC or mid frequency magnetron sputtering, or high power pulsed magnetron sputtering HPPMS.

10. The method of claim 1, wherein one or more of the plurality of strips are configured with one or more different widths or lengths to form one or more different discrete battery devices overlying the substrate.

11. The method of claim 1, further comprising providing a function enhancement region in the solid-state battery device, the function enhancement region being provided:
   to increase resistance to environmental degradation;
   to decrease lithium diffusion;
   to increase resistance to scratching;
   to increase resistance to solvents;
   to enhance printing ink adhesion;
   to provide color;
   to provide gloss;
   to provide reduced odor transmission;
   to provide thermal protection;
   to enhance thermal transfer;
   to help constrain expansion;
   to provide a gettering function to moisture;
   to provide a gettering function to oxygen;
   to provide a gettering function to nitrogen;
   to enhance tolerance to thermal shock;
   to enhance resistance to or transmission of EMI interference;
   to minimize stress;
   to provide temporary adhesion for improvement of secondary manufacturing steps;
   to increase the frictional coefficient of the outer layer to increase ease of handling in assembly, packaging and use;
   to provide a removable protective layer to temporarily increase protection during storage, handling or WIP;
   to provide temporary electrical insulation of the battery device terminals; or
   to provide adhesion of one stack of battery devices to another stack of battery devices or to a package in a separate downstream process.

* * * * *